June 15, 1965   F. A. BELDECOS ETAL   3,189,320
METHOD OF COOLING TURBINE ROTORS AND DISCS
Filed April 29, 1963   2 Sheets-Sheet 1

INVENTORS
Frank A. Beldecos
and Robert O. Brown
BY

June 15, 1965 F. A. BELDECOS ETAL 3,189,320
METHOD OF COOLING TURBINE ROTORS AND DISCS
Filed April 29, 1963 2 Sheets-Sheet 2

United States Patent Office 3,189,320
Patented June 15, 1965

3,189,320
METHOD OF COOLING TURBINE ROTORS AND DISCS
Frank A. Beldecos, Nether Providence Township, Delaware County, Pa., and Robert O. Brown, Springfield, Pa., assignors to Westinghouse Electric Corporation, East Pittsburgh, Pa., a corporation of Pennsylvania
Filed Apr. 29, 1963, Ser. No. 276,439
4 Claims. (Cl. 253—39.15)

This invention relates to elastic fluid utilizing machines, more particularly to turbines motivated by elastic fluid, and has for an object to provide improved apparatus of this type.

Elastic fluid utilizing machines, such as turbines motivated by elastic fluid, now employ elastic fluid at such high temperature values, for thermodynamic considerations, that some cooling is desirable for the hot and highly stressed running components such as the rotor structure, rotor blades and the rotor disc structure supporting the rotor blades, to permit reliable operation at such elevated values. In view of the above, many schemes have heretofore been proposed for cooling the above hot running components by employment of coolant fluids (both liquid and gaseous).

It is an object of this invention to provide an improved, yet highly simple and effective arrangement for cooling at least the highly stressed, high temperature portions of an elastic fluid motivated turbine.

Another object of the invention is to provide a turbine cooling arrangement that employs partially expanded motive fluid as the coolant.

A further object of the invention is to provide a turbine cooling arrangement employing partially expanded motive fluid for minimizing leakage of unexpanded, higher energy, motive fluid past the rotor blade seal structure.

Briefly, in accordance with one aspect of the invention, an axial flow turbine employing hot elastic motive fluid (such as steam, for example) is provided with a rotor having a disc portion provided with a peripheral row of rotor blades, a stationary nozzle structure provided with an annular row of nozzle vanes for directing hot pressurized motive elastic fluid to the rotor blades, and blade sealing means for minimizing leakage of hot motive fluid from the main motive fluid path between the nozzle structure and the rotor blades.

The rotor disc has a downstream face partially defining a distribution chamber and an upstream face partially defining a sealing space communicating with the blade sealing means, and since the blade sealing means restricts, but does not entirely prevent, leakage of the unexpanded fluid, this leakage tends to overheat the upstream face of the rotor disc and the rotor blade roots.

Accordingly, the rotor disc is provided with a plurality of openings arranged in an annular array, extending from the upstream face to the downstream face and formed and arranged in a manner to pump a small portion of the partially expanded (and thus cooler) motive fluid from the distribution space to the sealing space with sufficient rise in pressure to substantially oppose the blade seal leakage. A portion of the thus pumped motive fluid is returned to the distribution space through additional apertures adjacent the blade roots, to provide continuous circulation of the cooler motive fluid. The remaining portion of the cooler motive fluid in the sealing space is directed axially past the labyrinth seals between the rotor and casing structure to provide further cooling of the rotor.

A further aspect of the invention resides in employing the above arrangement in one expansion section of a turbine having a plurality of expansion sections in a common casing and having a unitary rotor structure comprising a second rotor portion having second rotor blading associated with second nozzle structure. The two expansion sections are sealed from each other by the above-mentioned labyrinth seals and the second rotor portion is provided with axially extending passages communicating with the labyrinth seals. In this arrangement, the cooler motive fluid leaking past the labyrinth seals is subsequently directed through the passages in the second rotor portion to cool the second rotor portion.

The above and the objects are effected by the invention as will be apparent from the following description and claims taken in connection with the accompanying drawings, forming a part of this specification, in which:

Figure 1:
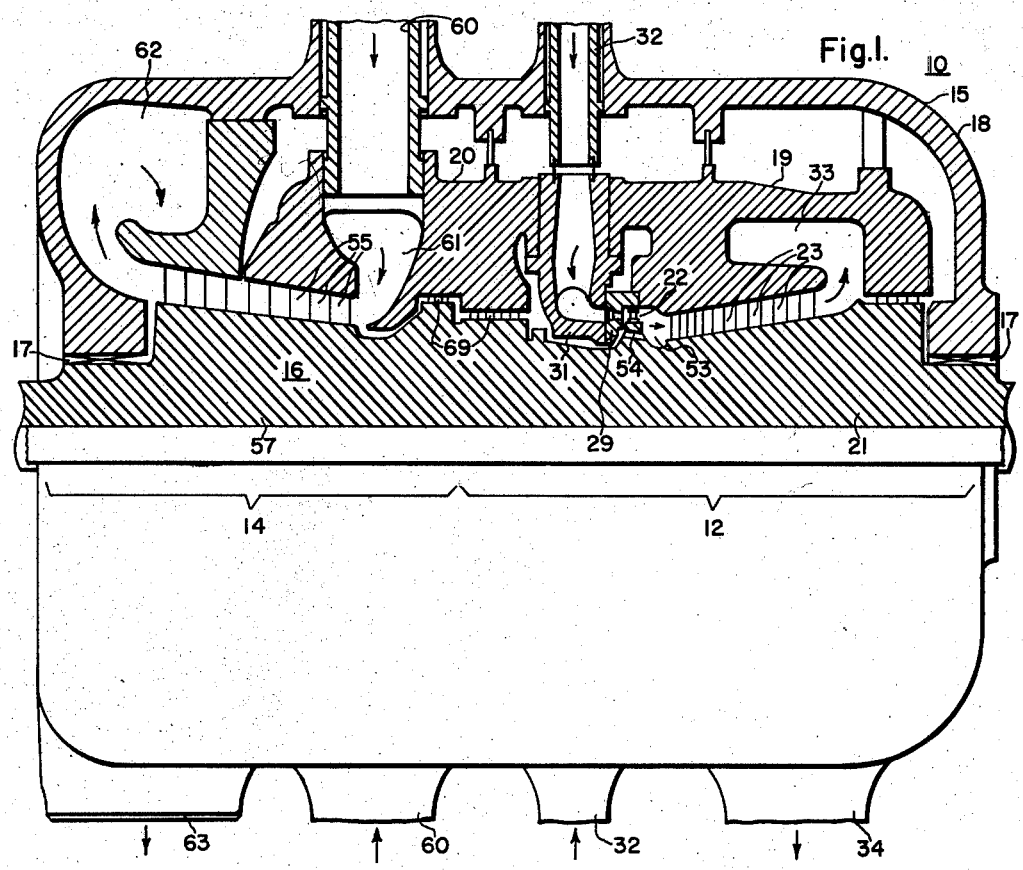
FIGURE 1 is a longitudinal view of a turbine incorporating the invention, the upper half being in section to show the internal arrangement.

Referring to the drawings in detail, in FIG. 1 there is shown an axial flow elastic fluid turbine generally designated 10 of the dual unit type, having a first motive fluid expansion section generally designated 12 and a second motive fluid expansion section generally designated 14 disposed within a unitary shell structure 15, and having a rotor structure 16 disposed within the shell structure 15 and supported therein for rotation by suitable bearings 17. The shell structure 15 includes an outer casing 18 and an inner casing structure 19 disposed within the outer casing 18 and spaced internally therefrom in a circumferential manner. The internal casing structure 19 further includes wall structure 20 acting to restrict flow of motive fluid from one of the expansion sections to the other during operation, as will subsequently be described.

The first expansion section 12 includes a first rotor portion 21 provided with a first expansion stage 22 and a plurality of subsequent expansion stages 23. The expansion stages 23, as well known in the art, comprise stationary nozzle vanes 24 arranged in annular rows and supported in the inner casing 19 and cooperating rows of rotor blades 25 attached to the rotor portion 21 and rotatable therewith.

Figure 2:
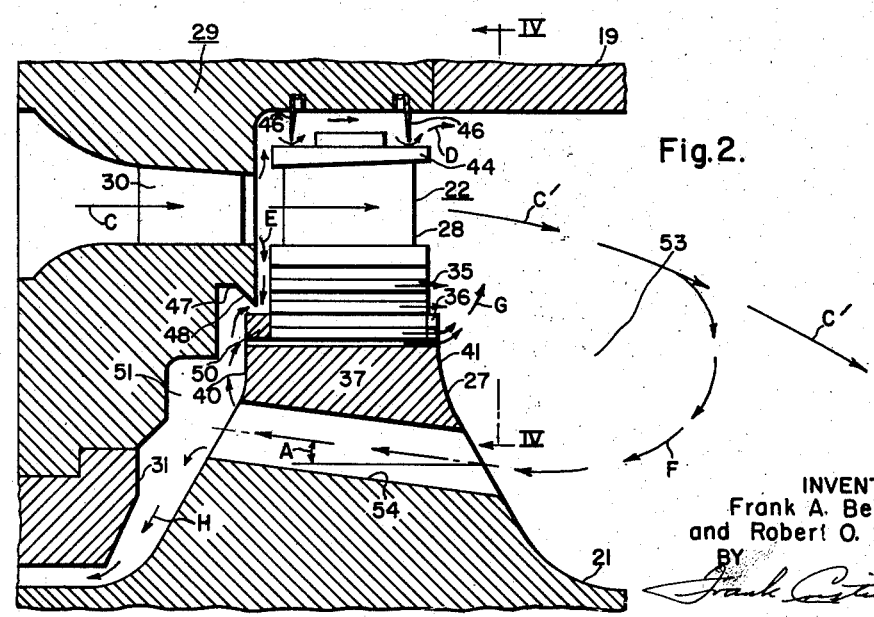
FIG. 2 is a highly enlarged fragmentary sectional view of a part of the structure shown in FIG. 1.
Figure 3:
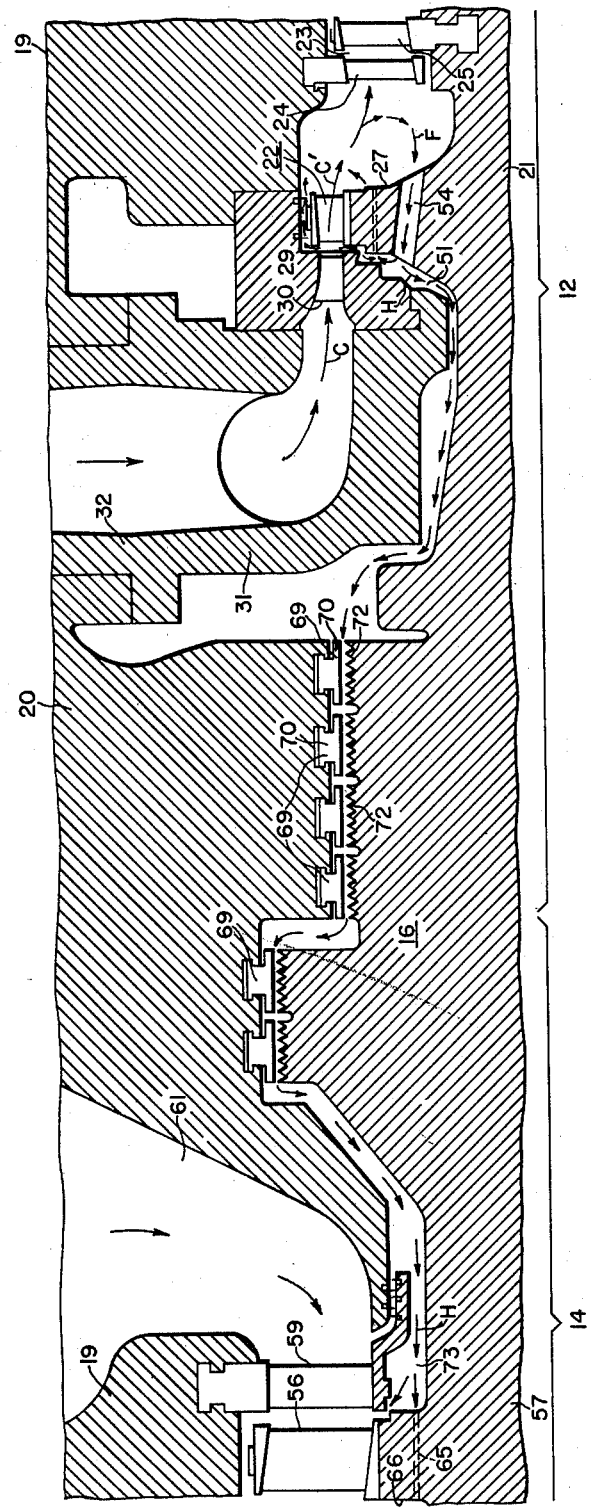
FIG. 3 is an enlarged sectional view showing in detail further structure shown in FIG. 1.

The first expansion stage 22, as more clearly shown in FIGS. 2 and 3, usually referred to as the "control stage" or "governing stage," employs a disc portion 27 provided in the rotor portion 21 and having an annular row of rotor blades 28 circumferentially disposed thereon. The rotor blades 28 are disposed immediately downstream of a stationary nozzle structure 29 having an annular array of nozzle vanes 30 cooperatively associated with the rotor blades 28 for directing the hot motive fluid thereto. Further, an annular nozzle chamber structure 31 is provided for directing the motive fluid to the nozzle vanes 30, and suitable conduit structure 32 extending through the outer casing structure 18 and the inner casing structure 19 is employed for directing the hot motive fluid to the nozzle chambers 31, as well known in the art.

As well known in the art, the control stage blades 28 are usually of the impulse type and extract considerable energy from the motivating fluid, so that a substantial pressure drop occurs across this stage, with concomitant reduction in temperature.

After expansion in the first expansion section 12, the fluid is directed to an exhaust annulus 33, and from the exhaust annulus it is directed through the outer casing 18 by a tubular exhaust conduit 34.

The rotor blades 28 may be of any suitable structural type, however, in the embodiment shown they are of the side-entry type having a serrated root portion 35, also known as a "fir tree" root, and the roots 35 are received in suitable complementary serrated recesses 36 (see FIG. 4) formed in a manner to retain the rotor blades 28 during operation. The fir tree roots 35 and the serrated recesses 36 are so formed with relation to each other that a bottom passage or opening 37 is formed at the lowermost portion of each root 35 and a plurality of smaller passages or openings 38 are formed adjacent the sides of the root. These openings 37 and 38 extend through the disc 27 from the upstream face 40 to the downstream face 41.

The blades 28 are connected to each other at their outermost ends or tips by annular shroud structure 44 disposed in radially inwardly spaced relation with the inner wall of the inner casing 19 and, to minimize the leakage of hot motive fluid therepast during operation, a plurality of stationary annular seal strips 46 are employed. These strips may be of any suitable type and extend radially inwardly into spaced relation with the shroud 44 to permit free rotation of the rotor 16 while restricting flow of the motive fluid therepast.

The nozzle structure 29 includes a nozzle ring 47 having an annular radially inwardly extending knife edge 48 disposed in closely spaced relation with a peripheral shoulder 50 formed on the rotor disc 27 to jointly therewith provide a blade seal to minimize leakage in radially inward direction (toward the upstream face 40 of the disc) of hot motive fluid before expansion in the rotor blades 28. The nozzle ring 47 and nozzle chamber 31 are shaped in such a manner that, jointly with the upstream face 40 of the disc member 27, a sealing space 51 is provided, which sealing space 51 is in restricted flow communication with the blade seal 48, 50.

Between the first expansion stage 22 and the subquent expansion stages 23, there is provided a space 53 for distribution of the motive fluid after expansion in the first stage. This space 53 is partly defined at its upstream end by the downstream face 41 of the rotor disc 27. The rotor disc 27 is provided with an annular row of openings or apertures 54, concentric with the axis of the rotor. These openings may be bores or the like, and extend through the disc to provide communication between the sealing space 51 and the distribution space 53. The openings 54 are employed to pump expanded motive fluid from the distribution chamber 53 through the disc 27 to the sealing space 51, during operation. Accordingly, the openings are formed and arranged to permit a pumping action to occur during operation. As illustrated in FIG. 2, the openings 54 may be inclined with the rotational axis of the rotor 16 at an angle A on the order of about 15°. The angle of inclination, size and number of the openings may be modified, as desired, to permit a larger or a smaller pumping action to occur during operation.

The second expansion section 14, is provided with a plurality of motive fluid expansion stages 55 which, as best illustrated in FIG. 3 include annular rows of rotor blades 56 peripherally mounted on the rotor portion 57 and stationary nozzle structures provided with annular rows of nozzle vanes 59 cooperatively associated with the rotor blades 56, as well known in the art. Hot motive fluid is directed to the second expansion section 14 through tubular conduit structure 60 extending through the outer casing 18 and the inner casing 19 into a nozzle chamber 61 and is thence directed through the expansion stages 55 to provide a motive effect upon the rotor 16. After expansion in the second expansion section 14, the fluid is directed to an exhaust annulus 62 formed by the outer and inner casings and, from the exhaust annulus 62, it is directed through the outer casing 18 by a tubular exhaust conduit 63.

As illustrated in FIG. 3, the rotor blades 56 may be provided at their bases with a plurality of passages 65 extending from one side of the associated rotor disc portion 66 to the other, and these passages 65 may also be provided by fir tree root structure of the type described in connection with the structure shown in FIGS. 2 and 3.

Although the two expansion sections 12 and 14 are isolated from each other by the internal wall structure 20, a plurality of labyrinth rotor seal structures 69 are provided therein to minimize or restrict the leakage of motive fluid from the expansion section 12 to the expansion section 14, while permitting freedom of rotation of the rotor during operation. These labyrinth seals 69 may be of any suitable type and, as illustrated, include a plurality of closely spaced rows of circular segments 70 cooperatively associated with groups of circular serrations 72 provided in the rotor 16. Accordingly, as well known in the art, the rotor 16 is freely rotatable and leakage flow of motive fluid past the labyrinth seals is restricted to a relatively small order.

The sealing space 51 of the first expansion section 12 is in direct communication with a second sealing space 73 formed adjacent the first expansion stage 55 of the second expansion section 14, so that, during operation, a major portion of the leakage flow from the sealing space 51 is directed to the second expansion section 14 through the labyrinth seals 69.

In operation, hot motive elastic fluid is admitted jointly through the conduits 32 to the first expansion section 12 and the conduits 60 to the second expansion section 14.

Figure 4:
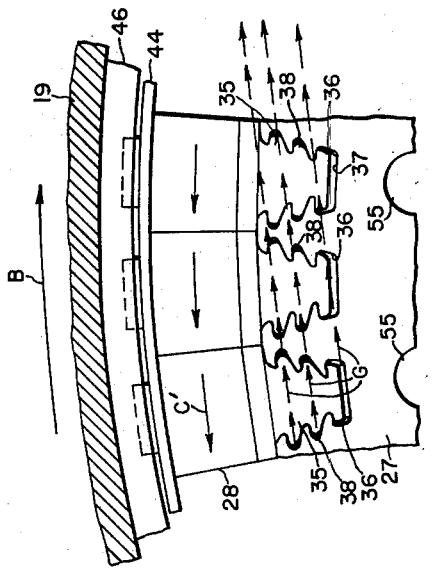
FIG. 4 is a fragmentary view taken on line IV—IV in FIG. 2.

First considering expansion section 12, the motive fluid is directed through the nozzle chamber 31 to the first expansion stage 22, as indicated by arrow C, and, during such flow, all but a small portion of the main fluid stream is directed through the rotor blades 28 to motivate the rotor, for example in the direction of the arrow B in FIG. 4. The main motive stream after flow through the row of rotor blades 28 is indicated by the arrows C' in FIGS. 2 and 3. Small amounts of leakage are directed around the outer shroud 44 of the blades 28 past the seals 46, as indicated by the arrows D, and this leakage subsequently rejoins the main motive stream C' in the distribution space 53. A second leakage path, as indicated by the arrows E, is established past the blade seal structure 48 and 50 and this leakage path is in direct communication with the sealing space 51. However, the pumping apertures 54, during operation, are effective to pump a small portion of the expanded motive fluid from the distribution space 53 through the disc 27 into the sealing space 51, as indicated by the arrows F, and hence the pressurization of the fluid in the sealing space 51 is raised to a level sufficient to substantially oppose the flow of the hot motive fluid leakage E thereinto. A portion of the motive fluid is thence directed from the sealing space 51 in radially outward direction along the upstream face 40 of the disc member 27, to cool the same, then mixes with leakage flow E and flows through the apertures 37 and 38 formed adjacent the roots of the blades 28 back into the distribution space 53. Accordingly, it will be seen that one portion of the expanded motive fluid entering the sealing space 51 is returned to the distribution chamber 53 and is effective to provide continuous flow of expanded and thus cooler fluid along the upstream face 40 and transfer the heat extracted during such flow to the distribution chamber 53.

Referring to FIG. 4, assuming rotation of the rotor in clockwise direction B, the main motive fluid stream C' issues from the rotor blades 28 with a counterclockwise vortical component, while the return flow G issues from the apertures 37 and 38 with a clockwise vortical component. Accordingly, intimate mixing of the flow G with the stream C' is attained before the fluid stream F is diverted from the stream C'.

About 10% of the fluid pumped into the sealing space 51 is employed to oppose and mix with the hot motive leakage E for recirculation in the manner described above.

The remaining 90% of the motive fluid from the sealing space 51 is directed by the flow path, indicated by the arrows H, through the labyrinth rotor seals 69 to the sealing space 73 in the second expansion section 14 and thence through the openings 65 in the rotor portion of the second expansion section 14 to cool the rotor structure and blade roots thereof during operation. This cooling flow subsequently joins the motive fluid directed through the expansion stages 55 and is exhausted into the exhaust annulus 62.

The expansion section 12 may be operated at a higher pressure than the expansion section 14, and, as well known in the art, the motive fluid after expansion in the first section 12 and being exhausted through the exhaust outlet 34 in the first section, may be directed to a suitable reheater (not shown), where it is reheated to substantially the same inlet temperature value as originally, before employment in the second expansion section 14.

Accordingly, it will now be seen that the motive fluid escaping from the sealing space 51 through the labyrinth seals 69 into the second expansion section 14 serves the highly useful function of providing cooling for the second expansion section 14. This cooling is primarily effective in the higher expansion stages of the second section 14, where the operating environment is at its highest temperature value, so that the higher stages of the second section 14 are protected against overheating by the leakage stream directed through the openings 65 in the bases of the blades 56.

Similarly, in the first expansion section 12 the cooling effect of the arrangement shown and described, in accordance with the invention, is primarily effective to minimize overheating of the rotor disc 27 and the blade roots 35 of the first expansion stage 22, since the temperature of the motive fluid in this region is at the highest value. Subsequent to expansion in the first expansion stage 22, the partially expanded motive fluid comprising the main motive stream C' is directed into the subsequent expansion stages 23 at a lower temperature value that may be readily assumed by the rotor portion 21 and blades 25.

The following data in tabulated form is shown to give representative operating characteristics of the turbine when the motive fluid directed to the first expansion section 12 is on the order of 4,000,000 pounds per hour and at a value of 3375 p.s.i.a. and 995° F.

| Fluid Flow | Temp., °F | Pressure, p.s.i.a. | Flow Rate, lb./hour |
| --- | --- | --- | --- |
| C | 995 | 3,375 | $4 \times 10^6$ |
| C' | 927 | 2,735 | |
| D | 968 | | |
| E | 968 | | $3 \times 10^3$ |
| V | 932 | | $3 \times 10^4$ |
| G | 968 | | $6 \times 10^3$ |
| H | 935 | | $27 \times 10^4$ |

It will now be seen that the invention provides a highly improved and highly effective, yet simple, arrangement for cooling the hot running components of an axial flow turbine employing steam or other gaseous media for motivating the same.

It will further be seen that the fluid employed to cool the hot running components is the same fluid that is employed for motivating the turbine, so that the employment of additional sources of coolant fluid is not required. Also, with the arrangement shown and described, the motive fluid that is employed for cooling purposes is further rendered effective to minimize leakage of hot motive fluid, before expansion in a stage, that otherwise would flow into the sealing space 51 to overheat the blade roots 35 and the upstream face 40 of the rotor disc 27.

It will be further seen that the invention provides a simple yet effective arrangement for cooling the motive fluid that is unavoidably directed through the labyrinth seals and employs an arrangement for utilizing the fluid escaping through the labyrinth seals to cool a second expansion section disposed within the same casing structure.

The invention is primarily advantageous when employed with a governing stage of a turbine. However, it is not so limited and may also be employed with other types of stages employing reaction blades, for example.

Although only one embodiment has been shown, it will be readily apparent to those skilled in the art that various changes in form and arrangement of parts may be made to suit requirements without departing from the spirit and scope of the invention.

We claim as our invention:
1. A cooling and sealing arrangement for a dual unit axial flow elastic fluid turbine, comprising
   a first plural stage motive fluid expansion section and a second plural stage motive fluid expansion section disposed within a unitary shell structure,
   wall structure interposed between said first and second expansion sections,
   means for directing motive fluid to said first expansion section,
   means for directing motive fluid to said second expansion section,
   a rotor structure comprising a first bladed disc portion and a second bladed disc portion disposed in said first expansion section and said second expansion section, respectively,
   rotor sealing means disposed between said wall and said rotor intermediate said first and second discs for restricting leakage of motive fluid along said rotor from said first expansion section to said second expansion section,
   means defining a distribution space for expanded motive fluid on the downstream side of said first disc,
   blade sealing means for minimizing leakage of unexpanded motive fluid on the upstream side of said first disc,
   means defining a sealing space on the upstream side of said first disc and communicating with said blade sealing means, and
   means for pumping expanded motive fluid from said distribution space through said first disc to said sealing space for cooling said first disc,
   said rotor sealing means being in fluid communication with said sealing space and said second rotor disc and being effective to conduct at least a portion of the expanded motive fluid in said sealing space to said second rotor disc for cooling said second rotor disc.

2. A cooling and sealing arrangement for a dual unit axial flow elastic fluid turbine, comprising
   a first plural stage motive fluid expansion section and a second plural stage motive fluid expansion section disposed within a unitary shell structure,
   said shell including a wall structure interposed between said sections,
   means for directing hot motive fluid to said first expansion section,
   means for directing hot motive fluid to said second expansion section,
   a rotor structure disposed in said shell and comprising a first bladed disc portion and a second bladed disc portion disposed in said first expansion section and said second expansion section, respectively,
   rotor labryrinth seal means disposed between said wall and said rotor intermediate said first and second discs for restricting leakage of motive fluid along said rotor from said first expansion section to said second expansion section,
   means defining a motive fluid distribution space on the downstream side of said first disc,
   blade sealing means for minimizing leakage of unexpanded motive fluid on the upstream side of said first disc,
   means defining a sealing space on the upstream side of said first disc and communicating with said blade sealing means, means for pumping expanded motive fluid from said distribution space through said first disc to said sealing space for cooling said first disc, said rotor sealing means being in fluid communication with said sealing space and said second rotor disc and being effective to conduct at least a portion of the expanded motive fluid in said sealing space to said second rotor disc for cooling said second rotor disc, and passage means for directing the remaining portion of the expanded motive fluid in said sealing space through said first disc to said distribution space.

3. A cooling and sealing arrangement for a dual unit axial flow elastic fluid turbine, comprising a first plural stage motive fluid expansion section and a second plural stage motive fluid expansion section disposed within a unitary shell structure, means including first nozzle structure for directing hot motive fluid to said first expansion section, means including second nozzle structure for directing hot motive fluid to said second expansion section, said shell including a wall structure interposed between said sections, a rotor structure comprising a first bladed disc portion and a second bladed disc portion disposed in said first section and said second section, respectively, and cooperatively associated with said first and second nozzle structure, respectively, rotor labyrinth seal means disposed between said wall and said rotor intermediate said first and second nozzle structures for restricting leakage of motive fluid along said rotor from said first expansion section to said second expansion section, means defining a distribution space for expanded motive fluid on the downstream side of said first disc, blade sealing means interposed between said first nozzle structure and said first disc for minimizing leakage of unexpanded motive fluid on the upstream side of said first disc, means defining a sealing space on the upstream side of said first disc and communicating with said blade sealing means, said first disc having a plurality of apertures for pumping expanded motive fluid from said distribution space through said first disc to said sealing space for cooling said first disc, said rotor sealing means being in fluid communication with said sealing space and said second rotor disc and being effective to conduct a major portion of the expanded motive fluid in said sealing space to said second rotor disc for cooling said second rotor disc, and means defining a plurality of passages adjacent the periphery of said first rotor disc for recirculating the remaining minor portion of the expanded motive fluid in said sealing space through said first disc to said distribution space.

4. A high temperature axial flow elastic fluid turbine, comprising a first motive fluid expansion stage and a second motive fluid expansion stage, said first stage and said second stage being disposed in axially spaced relation with each other and jointly defining in part a distribution space for motive fluid after expansion in the first stage, said first stage including a nozzle structure having an annular row of stationary nozzle vanes, a rotor disc disposed adjacent said nozzle structure and having an annular row of blades circumferentially disposed thereon and cooperatively associated with said nozzle vanes, means for axially directing motive fluid at a first temperature and pressure past said nozzle vanes and said rotor blades to rotate said rotor disc, sealing means provided on said rotor disc and said nozzle structure for restricting leakage of the motive fluid therepast, said rotor disc having a downstream face partly defining said distribution space and an upstream face partly defining a second fluid space, and means for minimizing overheating of said disc by the hot motive fluid leakage, comprising means defining an annular row of openings extending through said disc and providing primary fluid communication between said redistribution space and said second space, passage means providing secondary fluid communication through said disc between said second space and said distribution space adjacent said blades, said blades being effective to expand the motive fluid to a second and lower temperature and pressure, said openings being formed and arranged to pump a portion of the motive fluid through said disc from said distribution space to said second space, thereby increasing the fluid pressure in said second space to a value sufficient to minimize admission of hot motive fluid leakage past said sealing means and inducing flow of the motive fluid from said second space to said distribution space with attendant cooling of said rotor disc.

References Cited by the Examiner

FOREIGN PATENTS

| | | |
|---|---|---|
| 1,262,633 | 4/61 | France. |
| 1,165,586 | 6/58 | France. |
| 579,316 | 7/46 | Great Britain. |
| 929,103 | 6/63 | Great Britain. |
| 593,731 | 3/59 | Italy. |

JOSEPH H. BRANSON, Jr., *Primary Examiner.*